United States Patent [19]

Morena

[11] Patent Number: 5,516,733
[45] Date of Patent: May 14, 1996

[54] FUSION SEAL AND SEALING MIXTURES

[75] Inventor: Robert Morena, Caton, N.Y.

[73] Assignee: Corning Incorporated, Corning, N.Y.

[21] Appl. No.: 512,618

[22] Filed: Aug. 8, 1995

Related U.S. Application Data

[63] Continuation-in-part of Ser. No. 221,400, Mar. 31, 1994, abandoned.

[51] Int. Cl.$^6$ ..................................................... C03C 8/24
[52] U.S. Cl. .................................. 501/15; 501/10; 501/17; 501/18; 501/24; 501/32; 428/428
[58] Field of Search .............................. 501/10, 15, 17, 501/18, 24, 32; 423/428; 313/480

[56] References Cited

U.S. PATENT DOCUMENTS

| | | | |
|---|---|---|---|
| 4,576,920 | 3/1986 | MacDonell | 501/10 |
| 5,021,366 | 6/1991 | Aitken | 501/45 |
| 5,071,795 | 12/1991 | Beall et al. | 501/44 |
| 5,089,445 | 2/1992 | Francis | 501/15 |
| 5,122,484 | 6/1992 | Beall et al. | 501/15 |
| 5,179,046 | 1/1993 | Francis et al. | 501/19 |
| 5,246,890 | 9/1993 | Aitken et al. | 501/15 |
| 5,256,604 | 10/1993 | Aitken | 501/45 |
| 5,281,560 | 1/1994 | Francis et al. | 501/15 |
| 5,470,804 | 11/1995 | Morena | 501/15 |

FOREIGN PATENT DOCUMENTS 1186590  10/1985  U.S.S.R. ................. 501/15

*Primary Examiner*—Karl Group
*Assistant Examiner*—David Sample
*Attorney, Agent, or Firm*—Milton M. Peterson

[57] ABSTRACT

A fusion seal between two surfaces, and a material to produce the seal, consist essentially of 60–90 percent by weight of a $SnO$—$ZnO$—$P_2O_5$ glass frit and 10–40 percent by weight of a mill addition including alumina and, optionally, zircon, the alumina content being at least 10% when it constitutes the mill addition and not over 20% in conjunction with zircon, 0–15 % of a further additive that reduces the effective CTE of the seal, the mill addition being present in a sufficient amount to cause a substantial change in viscosity-temperature characteristics of the material after formation of a seal. The effect of the mill addition on viscosity in a fusion seal finds particular application in uniting the faceplate and funnel members to form a cathode ray tube envelope.

19 Claims, 3 Drawing Sheets

FUSION SEAL AND SEALING MIXTURES

This application is a continuation-in-part of application Ser. No. 08/221,400 filed Mar. 31, 1994, now abandoned.

FIELD OF THE INVENTIONS

A fusion seal joining two surfaces and produced from a mixture of tin-zinc-phosphate glass with a mill addition of fillers.

BACKGROUND OF THE INVENTION

The invention is broadly applicable to joining glass, metal and ceramic components. However, it is particularly applicable to producing envelopes for cathode ray tubes, and the description is so directed.

It is customary in producing cathode ray tube envelopes to press funnel and faceplate components separately. These components are then joined with a fusion seal employing a mid-temperature sealing glass frit.

Lead-zinc-borate sealing glasses, both crystallizing and non-crystallizing, have been used commercially for this purpose over a long period of time. These glasses have proven very successful for the purpose. However, there has been a continuing search for a sealing material that would retain all of the attributes of the lead glasses, but would further improve on some of these features.

A driving force in this search has been a desire for a glass having an even lower sealing temperature than the lead-zinc-borate type glass. Such a lower temperature glass would be more compatible with thermally sensitive components and coatings present in electronic products such as cathode ray tubes. More recently, the search has been accelerated by the desire to eliminate lead for health and safety reasons.

The materials search led to development of tin-zinc-phosphate glasses as described in U.S. Pat. No. 5,246,890 (Aitken et al.) and No. 5,281,560 (Francis et al.). The glasses described in these patents are lead-free, and provide somewhat lower sealing temperatures in the range of 400°–450° C.

The Aitken et al. glasses are of particular interest for use in producing seals in cathode ray tube envelopes because of their relatively low tin oxide contents. In addition to being lead-free, these glasses have compositions containing 25–50 mole % $P_2O_5$ and SnO and ZnO in amounts such that the mole ratio of SnO:ZnO is in the range of 1:1 to 5:1. The glass compositions may further contain up to 20 mole % of modifying oxides including up to 5 mole % $SiO_2$, up to 20 mole % $B_2O_3$, and up to 5 mole % $Al_2O_3$. They may also contain one or more crystallization promoters selected from 1 to 5 mole % zircon and/or zirconia and 1–15 mole % $R_2O$. Additionally, the composition may include a seal adherence promoter selected from up to 5 mole % $WO_3$, up to 5 mole % $MoO_3$, up to 0.10 mole % Ag metal and mixtures.

In producing a sealing material, mill additions to the sealing glass may be made in amounts up to about 30% by weight with no more than 15% being preferred. These additions are made to provide a sealing material having a lower effective coefficient of thermal expansion (CTE). The mill additions include metal pyrophosphate crystalline materials, cordierite, solid solutions of beta-spodumene or beta-eucryptite, silica and quartz glasses and Invar.

The manufacturing process for cathode ray tubes imposes severe viscosity/temperature restraints on a frit intended for use in sealing envelope components. One such restraint arises from the need to conduct the sealing operation at temperatures that do not exceed the strain point of the funnel glass. This requirement, in turn, necessitates that the viscosity of a sealing frit must be in the range of $10^3$–$10^4$ poises ($10^2$–$10^3$ Pa.s) at a temperature on the order of 450° C. Otherwise, the frit will have insufficient flow to form a seal with a strong hermetic bond.

Following the sealing operation, the panel-funnel assembly is reheated under vacuum to a temperature in the range of 300°–400° C. in an exhaust bake-out process. This bake-out removes volatile constituents of the electronic system, and establishes the needed vacuum level in the tube to assure long tube life. The frit requirement for this second step in the process is essentially the opposite of that needed for successful sealing. To survive the exhaust bake-out, the frit must be rigid at exhaust temperatures. This requires a minimum viscosity of $10^9$ poises ($10^8$ Pa.s), preferably $10^{13}$ poises ($10^{12}$ Pa.s), to avoid movement in the seal and resulting breakage or loss of vacuum.

These dual viscosity/temperature requirements are met currently by employing high lead frits in the PbO—ZnO—$B_2O_3$ system that form a crystallized seal. These lead frits are initially vitreous, but have a small amount of zircon or alumina added as a mill addition to induce crystallization. The frits exhibit excellent flow during the initial portion of the hold at the 440°–450° sealing temperature. Near the end of this hold period, they undergo rapid crystallization to a degree greater than 95%. This forms a strong, rigid seal which remains rigid during the exhaust bake-out process.

Frits in the SnO—ZnO—$P_2O_5$ ternary system exhibit good flow properties at temperatures as low as 360° C. They also have expansion coefficients close to the requisite 95–100×$10^{-7}$/° C. range needed for compatibility with current panel and funnel glasses. However, the glass frits are relatively resistant to crystallization and tend to behave essentially as a vitreous flit. As a result, these flits form good seals, but have exhibited a poor survival rate in the exhaust process.

The present invention solves this problem by providing a modified sealing material based on a SnO—ZnO—$P_2O_5$ glass frit. The sealing material forms a seal, but then undergoes a substantial change in viscosity/temperature characteristics under thermal influence. The nature of this change is such that the seal remains rigid and does not soften during a subsequent vacuum bake-out process.

SUMMARY OF THE INVENTION

My invention resides in part in a fusion seal between the surfaces of two bodies, the fusion seal consisting essentially by weight of 60–90% of a SnO—ZnO—$P_2O_5$ glass and 10–40% of a mill addition comprising alumina and, optionally, zircon, the alumina content being at least 10% when it constitutes the mill addition and not over 20% in conjunction with zircon, the total content of alumina and zircon being 10–40%, the seal having a phosphate crystal phase crystallized in situ which, in combination with the mill addition, causes a substantial change in the viscosity temperature characteristics of the seal.

The invention further resides in a fusion sealing material consisting essentially by weight of 60–90% of a SnO—ZnO—$P_2O_5$ glass frit mixed with 10–40% of a mill addition comprising alumina and, optionally, zircon, the alumina content being at least 10% when it constitutes the mill addition and not over 20% in conjunction with zircon, the total of alumina and zircon being 10–40%, the sealing material being capable of thermal treatment to develop a phosphate crystal phase that substantially changes the effective viscosity-temperature characteristics in a seal formed from the material whereby the seal does not soften on reheating.

The invention also resides in a method of producing a cathode ray tube envelope which comprises mixing 10–40% by weight of a mill addition with 60–90% by weight of a SnO—ZnO—$P_2O_5$ sealing glass frit, the mill addition comprising alumina and, optionally, zircon, the alumina content being at least 10% when it constitutes the mill addition and not over 20% in conjunction with zircon, the total content of alumina and zircon being 10–40%, applying the mixture of glass and mill addition between the peripheral surfaces of funnel and faceplate members, heating the assembly to sealing temperature to produce a seal and to initiate crystallization of a phosphate phase, cooling and subsequently reheating the sealed envelope under vacuum to a bake-out temperature.

BRIEF DESCRIPTION OF THE DRAWINGS

In the accompanying drawing.

PRIOR ART

In addition to the patents already mentioned, prior patents of possible interest are listed in an accompanying document.

DESCRIPTION OF THE INVENTION

Figure 1:
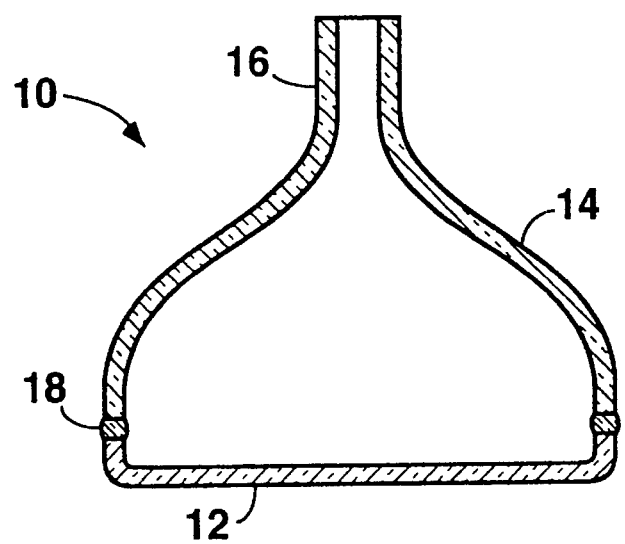
FIG. 1 is a side view in cross-section of a typical cathode ray tube envelope showing a fusion seal between the funnel and panel members.

FIG. 1 in the accompanying drawing shows a typical CRT envelope blank composed of a faceplate portion 12, a funnel portion 14 and a neck portion 16. Faceplate 12 and funnel 14 are joined by a fusion seal 18 between the peripheral edges of the faceplate and funnel. The present invention is primarily concerned with fusion seal 18, and with an improved material for, and method of, producing that seal.

In producing seal 18, I employ SnO—ZnO—$P_2O_5$ sealing glasses selected from those disclosed in the Aitken et al. patent, and described in the Background section of this application. Accordingly, the teachings of that patent, in their entirety, are incorporated herein by reference.

It is a feature of the present invention that an appreciable quantity of a certain mill addition is added to a powdered SnO—ZnO—$P_2O_5$ glass frit as disclosed in the Aitken et al. patent to form a sealing material. It is a further feature of the invention that a phosphate crystal phase is thermally developed in a seal produced with the material. The combination of this crystal phase with the mill addition causes a substantial change in the viscosity-temperature characteristics of the seal such that the seal remains rigid when reheated as in a bakeout step.

It is, of course, well known to make mill additions to sealing glasses, primarily to lower the effective CTE of the glass frit. In fact, the Aitken et al. patent discloses several mill additions for that particular purpose. The present invention contemplates the optional use of such additions for that purpose. These additives include cordierite, metal pyrophosphates and beta-quartz. Their partial substitution neither enhances nor detracts from the unique effect of the mill addition that characterizes the present invention. However, amounts greater than about 15%, particularly in conjunction with the present mill additions, tend to interfere with seal formation.

The present invention is founded on the discovery that a particular combination of components in a sealing mixture affects in a unique manner the viscosity-temperature characteristics of a seal produced therefrom. Normally, the viscosity of a glass seal decreases rapidly as temperature is increased. In accordance with the present invention, this normal decrease does not occur. Rather, little or no change in viscosity occurs as temperature is increased within the temperature range of 275°–350° C.

The effect is evident in the region of $10^9$ to $10^{13}$ poises in a sealing mixture based on a SnO—ZnO—$P_2O_5$ sealing glass frit. This is a viscosity region critical to successful bake-out of a cathode ray tube envelope embodying a seal. The practical effect is to provide a seal that remains rigid and unyielding during a bake-out cycle under vacuum at temperatures in the range of 350°–400° C.

The unique viscosity-temperature effects of the invention are provided by a mill addition that may be either alumina alone, or in combination with zircon. To be effective alone, alumina must be added to the glass frit in an amount of 10–30% by weight. Zircon is not required, but a mixture of alumina and zircon in an amount of 15–40% is preferred.

Zircon is effective only in conjunction with alumina up to about 20%. A preferred alumina content is about 5–15% and the content of the zircon-alumina mixture should not exceed 40%.

The minimum amounts of the various mill additions are necessary to attain the desired viscosity-temperature properties. Amounts greater than the maxima tend to prevent adequate flow of the sealing material at sealing temperatures. Such glass flow is necessary to wet the sealing surface and form a seal therewith.

The mill addition of alumina, alone or mixed with zircon, while a necessary component of the invention, is not consistently effective by itself. In addition, it is necessary to develop a small amount of a crystal phase in a seal. The amount required may be relatively minor, preferably 5–10%, but its presence is essential to consistent behavior during a reheat step.

Development of the crystal phase requires a sealing temperature that is at least about 450° C. and preferably higher. Successful development of adequate crystal phase at 450° C. is marginal, and requires optimum conditions. There must also be a sufficient hold at the sealing temperature to at least initiate crystal phase development. This may be on the order of 45 minutes to an hour to insure adequate crystal development.

The exact nature of the crystal phase has not been conclusively identified. The glass composition essentially dictates a phosphate phase. X-ray diffraction (XRD) studies provide curves that confirm a phosphate structure, but do not match any known phosphate single phases. They suggest a zinc phosphate structure, possibly modified by aluminum.

The exact nature, and mode of operation, of the phenomenon affecting viscosity-temperature behavior in accordance with the invention is not definitely known. However, I believe the phenomenon takes place during the sealing cycle.

Thus, it appears that the glass frit in the sealing material initially softens, and wets the peripheral surfaces on which it is applied, in the usual manner to form a seal. During this sealing step, however, a stiffening network of some nature is initiated. This culminates in a seal that remains rigid, that is, that resists flow, and consequent deformation, during a subsequent bakeout.

Figure 2:
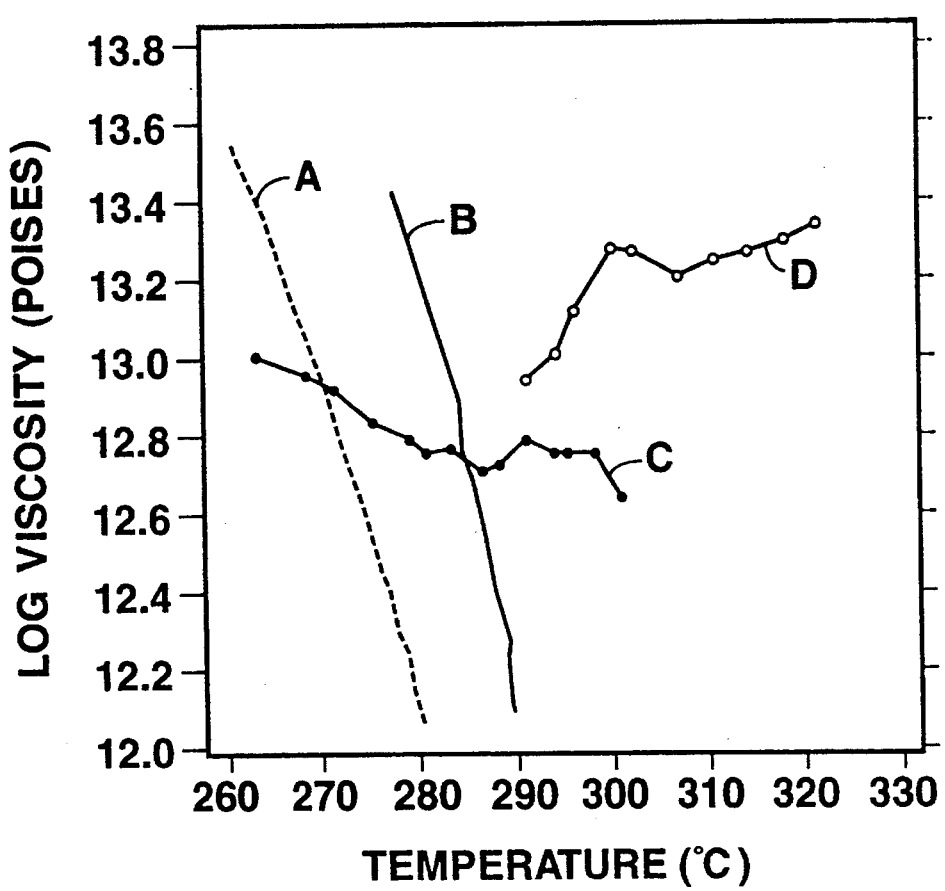
FIGS. 2–4 are graphical representations illustrating features of the present invention.

The unique viscosity-temperature effect achieved by the mill addition of the present invention is illustrated in FIG. 2 of the accompanying drawing. That FIGURE is a graphical representation wherein temperature in ° C. is plotted along the horizontal axis, and log viscosity in poises is plotted along the vertical axis.

FIG. 2 shows viscosity-temperature curves based on data obtained by measurements made on four different sealing material systems. Each system employed a SnO—ZnO—$P_2O_5$ glass frit containing 33 mole % $P_2O_5$ and SnO and ZnO in a molar ratio of 3.5:1. Mill additions were made in percent by weight of the sealing mixture.

The systems were:

A. Glass frit only.
B. 70% glass frit plus 30% zircon, 0% alumina.
C. 70% glass frit plus 20% zircon and 10 % alumina.
D. 70% glass frit plus 15% each of zircon and alumina.

The curves in FIG. 2 are identified by the same letter indicia.

The viscosity data plotted in FIG. 2 were obtained by a bending beam viscometer (BBV) method. In this method, a specimen in the form of a thin beam is suspended between two points with a small load suspended at the midpoint of the beam. The rate of deflection of the specimen is measured as a function of temperature. This measuring technique is particularly applicable for present purposes where viscosity values in the range of $10^{12}$–$10^{13}$ poises ($10^{11}$–$10^{12}$ Pa.s) are involved.

The data plotted in FIG. 2 were obtained from measurements made on fired bars. The bars were prepared by dry-pressing blends of frit powder together with any added mill addition. A few drops of isopropanol were added to 30 grams of the dry mix to aid in pressing. Each particular blend was made by roller milling the material in a plastic jar to provide a homogeneous mixture. This milling step was followed by sieving the material through a 100 mesh screen to break up any soft agglomerates. Each pressed bar was fired at a typical envelope sealing schedule, with the exception of the "glass frit only" material (A). This bar was sintered at 370° C. for one hour. Otherwise, flow would be too great to obtain the minimum thickness needed for the test beam. All of the blends showed excellent flow at their respective sintering temperatures.

The viscosity-temperature curves for both the untilled frit (A), and the frit filled with 30% zircon (B), are similar in nature. Each shows a sharp linear decrease in log viscosity with increasing temperature. This is typical of a material undergoing viscous flow. The $10^{13}$ poise ($10^{12}$ Pa.s) temperature for the untilled frit (A) was approximately 272° C. The addition of 30 parts by weight zircon to this frit (B) resulted in a stiffening of the frit, with the $10^{13}$ poise ($10^{12}$ Pa.s) temperature increasing to 287° C. The test specimens of both of these compositions showed considerable permanent curvature following the test. This attested to a large amount of viscous flow occurring during the test.

The viscosity-temperature curves for the other two specimens (C and D) are distinctly different from those for A and B. C and D are curves for the specimens of frit plus 10% alumina plus 20% zircon ($^{10}/_{20}$ blend), and flit plus 15% alumina plus zircon ($^{15}/_{15}$ blend), respectively. It is apparent that these log viscosity curves do not show a linear decrease with increasing temperature. Rather, the curves are relatively unchanged with increasing temperature, or even show an increase with increasing temperature.

The test specimens from the C and D blends were examined after completion of the test. They appeared essentially straight, that is, not permanently deformed. Thus, there was no evidence of any viscous flow occurring during either test. Yet both flit blends (C and D) flowed well during the sintering firing, and contained approximately the same amount of glass as the $^{0}/_{30}$ blend.

In addition to the sealing mixtures for which curves are shown in FIG. 2, a number of other mixtures have been considered. TABLE I below shows the composition of these mixtures in percent by weight of the mixtures. Whether the mixture was effective in showing the anomalous viscosity-temperature behavior, or not, is indicated by YES (positive) or NO (negative).

TABLE I

| $Al_2O_3$ | Zircon | Glass | Effective |
|---|---|---|---|
| 5 | 25 | 70 | NO |
| 10 | 5 | 85 | NO |
| 15 | 5 | 80 | YES |
| 20 | 0 | 80 | YES |
| 20 | 5 | 75 | YES |
| 25 | 0 | 75 | YES |

The mixtures described herein employed as additives commercially available alumina and zircon having mean particle sizes >5 μm. It is believed that the initial two mixtures in TABLE I would be effective at somewhat higher sealing temperatures and/or with use of very fine materials.

It is felt that the anomalous viscosity-temperature behavior that characterizes the present invention arises from a physical effect caused by the formation of an interlocking (or approximately interlocking) network. This network is thought to be set up between the mill addition particles and the small amount of crystal phase that develops within the frit. This occurs after some initial period of viscous flow during the formation of a seal. Thus, any initial flow, such as would occur during the firing of a seal in a CRT envelope, would occur prior to establishment of an interlocking network. The glass would then be confined to regions or cells within the network so that it would be unable to dominate subsequent flow behavior.

The mill addition plays an essential role in this behavior. However, the phosphate crystal phase is also essential. In its absence, the mill addition is not fully effective. In that case, normal viscous flow behavior, as illustrated by Curves A and B in FIG. 2, tends to prevail.

Studies indicate that development of a phosphate phase, and consequent modification of viscosity-temperature characteristics, is quite sensitive to temperature. At typical sealing temperatures of 440°–450° C., development of the crystal phase is marginal. If a favorable combination of other conditions, such as overheating, a favorable mill addition, a different frit, or finer particle size batch prevail, the phase may develop. However, to obtain consistent development, a sealing temperature in excess of 450° C. is preferred.

The development work described above was done with a base glass having an SnO/ZnO ratio of 3.5:1. However, the anomalous effect has been observed employing glasses having lower SnO/ZnO ratios down to about 2.0:1, and with higher SnO/ZnO ratios up to about 5.0:1 or higher. However, with the aim of meeting the dual requirements of both adequate flow at sealing temperature and high enough viscosity at exhaust temperature, I prefer a SnO/ZnO ratio in the range of 3.0–5.0/1 with the 3.5–4.5:1 ratio being considered most preferable.

The anomalous effect has also been observed in blends employing the mill additions described above with modifications of the basic glass frit composition. Thus, additions of $WO_3$, $Al_2O_3$, and $B_2O_3$ additions to the base glass, as described in the Aitken et al. patent, have had no apparent effect on the anomalous viscosity behavior. Also, partial replacement in the mill addition by other additives, such as crystalline pyrophosphates and cordierite, have not inhibited the anomalous behavior. Thus, these additions may be made for their known purpose of reducing the effective CTE of the mixture.

It has been observed that the necessary development of the phosphate crystal phase in a seal has an undesirable side effect. This is a tendency for tensile stress to develop as a seal is cooled or recycled. The stress value reaches a maximum at some point during the thermal cycle. It is manifested by a large mismatch between the coefficient of thermal expansion (CTE) of the seal and that of the substrate at that point.

As the expansion mismatch develops between a seal and its substrate, these bodies tend to contract from each other. This causes fracture or separation of the seal to occur if the mismatch value becomes too great.

A further feature of the invention is based on discovery of a means for ameliorating the mismatch problem. It has been found that substitution of $B_2O_3$ for $P_2O_5$ in the composition of the SnO—ZnO—$P_2O_5$ glass frit reduces the CTE of the frit. This in turn reduces the mismatch between a seal and its substrate.

The extent to which this substitution can be carried out is limited by an adverse effect on viscosity of the glass frit. Thus, the $B_2O_3$ for $P_2O_5$ substitution tends to increase the viscosity temperature characteristics of the glass. Consequently, the glass may not soften sufficiently to properly wet the substrate at sealing temperature.

The nature of mismatch development, and the effect of substituting $B_2O_3$ for $P_2O_5$, may be seen by comparisons made between glasses having the following compositions expressed in mole percent:

TABLE II

|  | 1 | 2 |
|---|---|---|
| $P_2O_5$ | 33.0 | 31.5 |
| $Al_2O_3$ | — | 0.6 |
| ZnO | 14.9 | 14.6 |
| SnO | 52.1 | 51.2 |
| $WO_3$ | — | 0.6 |
| $B_2O_3$ | — | 1.5 |

Sealing mixtures were prepared by preparing batches as described earlier for deflection bars used in measuring viscosity. Glass frit based on composition 1 was mixed with a mill addition of alumina and zircon to produce a mixture of 70% glass, 10% alumina and 20% zircon expressed in percent by weight. Likewise, glass frit based on composition 2 was mixed with a mill addition to produce a mixture of 74% glass, 6% alumina and 20% zircon.

Mismatch measurements were made on butt seals produced by bonding a thin layer of a sealing material to a substrate cut from a commercial cathode ray tube glass panel. The test seal in each instance was thermally cycled in a furnace. The differences in expansion (mismatch) between the sealing material and the substrate were measured employing a polariscope.

Figure 3:
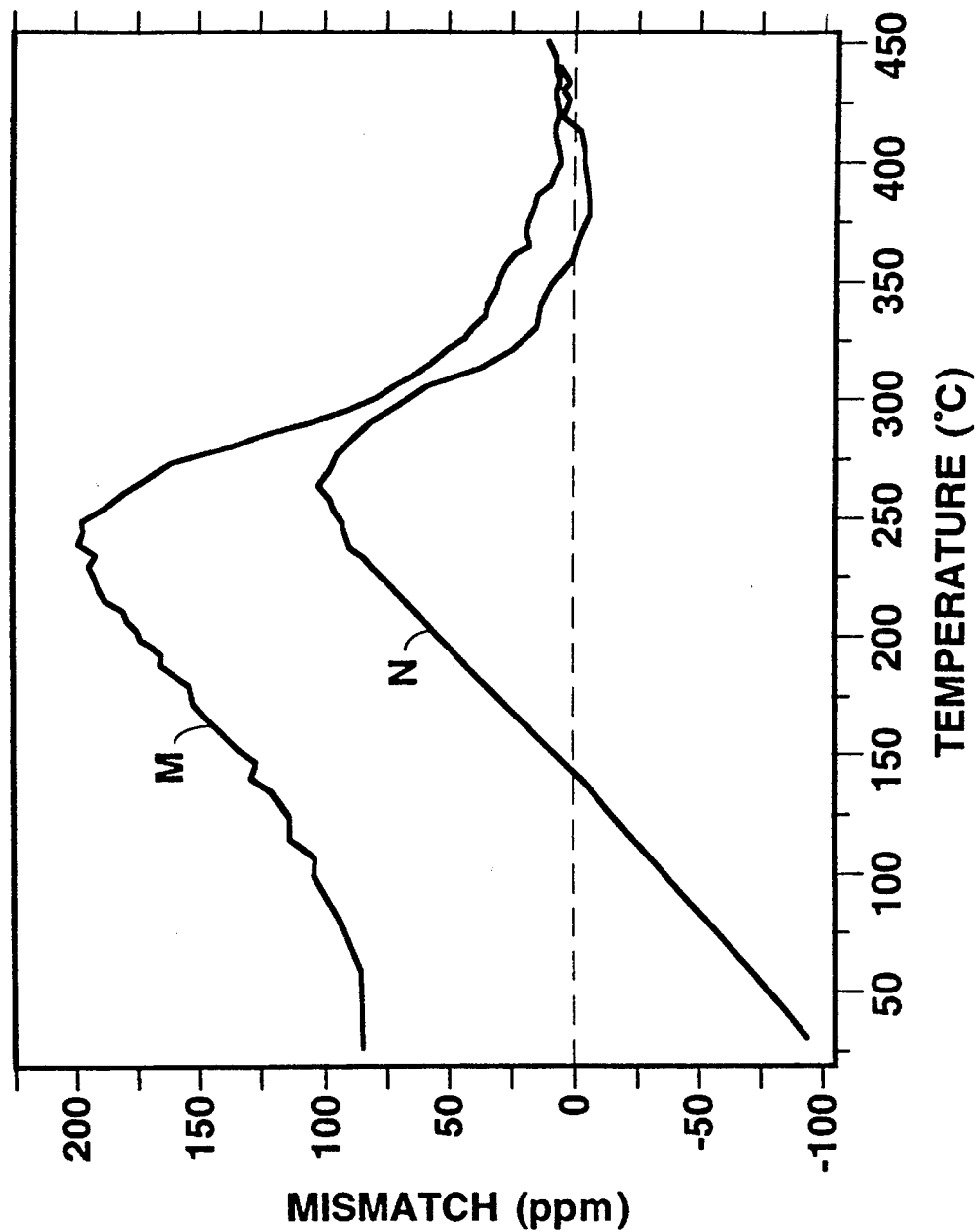

FIG. 3 in the accompanying drawing is a graphical illustration of the mismatch measurements made on the seals just described. Curves M and N are expansion mismatch curves illustrating stress change in the seals as they were cycled between the set point of the seal and ambient temperature. Curve M is based on measurements made on the seal employing the glass of composition 1 having no content of $B_2O_3$. Curve N is based on measurements made on the seal employing the glass of composition 2 containing 1.5% $B_2O_3$.

In FIG. 3, temperature in ° C. is plotted on the horizontal axis. Mismatch, in terms of parts per million (ppm) difference is plotted on the vertical axis. It is this expansion mismatch that directly creates stress during heating or cooling of a seal. The horizontal dashed line represents a condition where there is no difference in expansion characteristics, that is, there is zero mismatch and hence no stress at the given temperature. Mismatch values above that level on the y axis indicate tensile stress, while values below that level indicate compressive stress.

Figure 4:
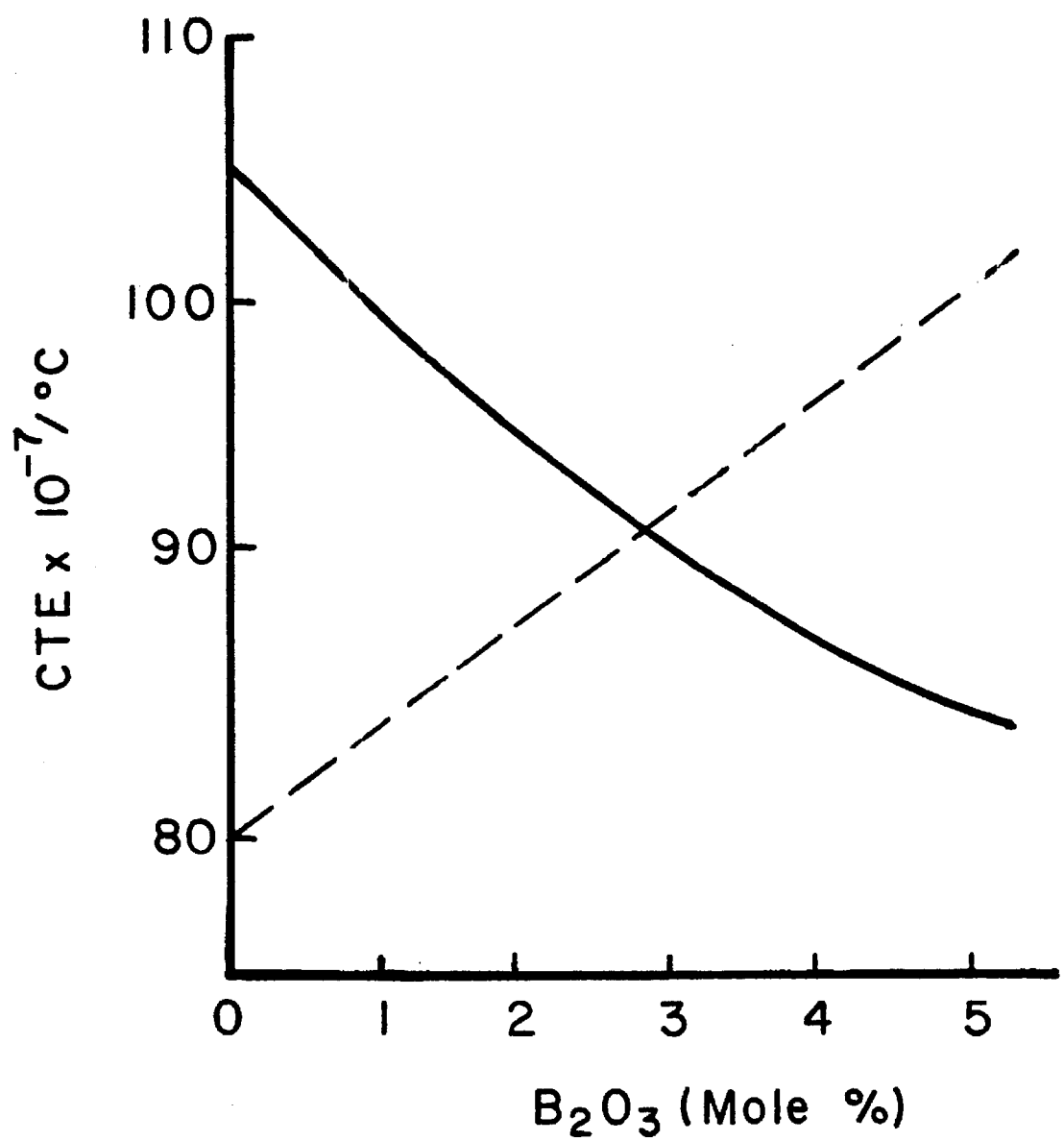

FIG. 4 is a graphical representation of the $B_2O_3$ substitution effect. $B_2O_3$ content in mole % is shown on the horizontal axis. CTE×$10^{-7}$° C. values are plotted on the vertical axis. The solid line curve shows the decrease in CTE values of a glass as $B_2O_3$ is substituted for $P_2O_5$. The dotted line curve shows the corresponding increase that occurs in glass viscosity.

The plotted data were obtained using a base glass formulated to have 33 mole % $P_2O_5$ with the remainder essentially SnO and ZnO in a molar ratio of 2:1. In addition to the base glass, five compositions were formulated with $B_2O_3$ being progressively substituted for $P_2O_5$ on a 1 mole % basis. Thus, all six glasses contained 33 mole % $P_2O_5$+$B_2O_3$ with the SnO and ZnO contents unchanged.

The glasses were melted, and measurements of CTE×$10^{-7}$/° C. and annealing point in ° C. made on each glass. The measured data furnished the basis for the curves shown in FIG. 4. As indicated, the viscosity-temperature characteristics, measured as the annealing point, steadily rise. The ability to form a cathode ray tube seal becomes marginal at about a 3 mole % substitution of $B_2O_3$ for $P_2O_5$. For such sealing, I prefer frit glasses containing $B_2O_3$ in an amount not over about 3 mole % with the $P_2O_5$+$B_2O_3$ content being about 33 mole %.

In order to further demonstrate the features of the invention, a study was made on a material system previously developed to provide a seal having improved mechanical strength. The material system employed a frit consisting of, in mole %, 33% $P_2O_5$, 13.4% ZnO and 53.6% SnO, the SnO:ZnO mole ratio being 4:1. The frit, ball milled to an average particle size of about 5–10 μm, was mixed with $Al_2O_3$ and zircon powder in a weight % ratio of 65% frit, 10% $Al_2O_3$ and 25% zircon. This system, when intimately mixed and pressed into disks, exhibited strength values of about 56.6 Mpa (8080 psi).

Two sets of test pieces were prepared and fired preparatory to making XRD studies for crystal phase development. As noted earlier, crystal development is marginal at temperatures of about 450° C. Accordingly, one set of test pieces was fired at a temperature well below 450° C.; a second set at a temperature well above 450 ° C.

One set of test pieces was heated to a temperature of 430° C. and held at that temperature for one hour. When analyzed by XRD, these samples showed no evidence of a phosphate crystal phase. Also, they evidenced normal viscous flow, as illustrated in Curves A and B of FIG. 2, when reheated.

A second set of test pieces, identical to those noted above, was heated to 485° C. and held at that temperature for one hour. When these test pieces were analyzed by XRD, an unidentified crystal phase having a phosphate structure was observed. It was estimated to constitute on the order of 10% of the seal. Viscosity-temperature measurements revealed a viscosity greater than about $10^{13}$ poise up to a bakeout temperature of 350° C. Thus, the viscosity-temperature curve for these test pieces corresponds to those shown in Curves C and D of FIG. 2.

The test results confirm the effect of the sealing cycle in producing a phosphate crystal phase. They further confirm the need to form such a crystal phase, as well as to make a mill addition of alumina in order to produce the unique viscosity-temperature behavior of the invention.

I claim:

1. A fusion seal between the surfaces of two bodies, the fusion seal consisting essentially of 60–90% by weight of a SnO—ZnO—$P_2O_5$ glass frit wherein the SnO and ZnO are present in the glass in a molar ratio of 5:1 to 2:1, and 10–40 percent by weight of a mill addition comprising alumina and, optionally, zircon, the alumina content being at least 10% when it constitutes the mill addition and not over 20% in conjunction with zircon, the total amount of alumina and zircon being 10–40%, the seal having a phosphate crystal phase crystallized in situ which, in combination with the mill addition, causes a substantial change in the viscosity temperature characteristics of the seal.

2. A fusion seal in accordance with claim 1 wherein the phosphate crystal phase constitutes about 5–10% of the seal.

3. A fusion seal in accordance with claim 1 wherein the mill addition constitutes 20–35 percent by weight based on the seal.

4. A fusion seal in accordance with claim 1 wherein the mill addition contains a further additive that reduces the effective CTE of the seal, the further additive being present in an amount not over about 15 percent by weight of the seal.

5. A fusion seal in accordance with claim 4 wherein the further additive is selected from the group composed of cordierite, metal pyrophosphates, silica glasses, quartz, Invar and solid solutions of beta-spodumene and beta-eucryptite.

6. A fusion seal in accordance with claim 1 wherein the glass frit consists essentially of 30–50 mole % $P_2O_5$, $B_2O_3$ in an amount not over about 3 mole % with the $P_2O_5+B_2O_3$ content being about 30–50 mole %.

7. A fusion seal in accordance with claim 6 wherein the glass frit optionally contains at least one modifying oxide selected from the group composed of up to 5 mole % $SiO_2$, up to 20 mole % $B_2O_3$, up to 5 mole % $Al_2O_3$ and up to 5 mole % $WO_3$.

8. A fusion seal in accordance with claim 6 wherein the molar ratio is 3.5–4.5:1.

9. A fusion sealing material consisting essentially of 60–90% by weight of a SnO—ZnO—$P_2O_5$ glass frit wherein the SnO and ZnO are present in the glass in a molar ratio of 5:1 to 2:1, and 10–40 percent by weight of a mill addition comprising alumina and, optionally, zircon, the alumina content being at least 10% when it constitutes the mill addition and not over 20% in conjunction with zircon, the total amount of alumina and zircon being 10–40%, the sealing material being capable of thermal treatment to develop a phosphate crystal phase that substantially changes the effective the viscosity temperature characteristics of a seal formed from the material whereby the seal does not soften upon reheating.

10. A fusion sealing material in accordance with claim 9 wherein the mill addition comprises, in weight percent, 15–40% zircon in admixture with alumina in an amount less than 15%.

11. A fusion sealing material in accordance with claim 9 wherein the mill addition comprises, in weight percent, 10–30% alumina alone.

12. A fusion sealing material in accordance with claim 9 wherein the mill addition is 20–35 percent by weight based on the sealing material.

13. A fusion sealing material in accordance with claim 9 wherein the mill addition contains a further additive that reduces the effective CTE of a seal formed from the material, the further additive not being over about 15 percent by weight of the sealing material.

14. A fusion sealing material in accordance with claim 13 wherein the further additive is selected from the group consisting of cordierite, metal pyrophosphates, silica glasses, quartz, Invar and solid solutions of beta-spodumene and beta-eucryptite.

15. A fusion sealing material in accordance with claim 10 wherein the glass flit consists essentially of 30–50 mole % $P_2O_5$, and optionally contains at least one modifying oxide selected from the group consisting of up to 5 mole % $SiO_2$, up to 3 mole % $B_2O_3$, up to 5 mole % $Al_2O_3$ and up to 5 mole % $WO_3$.

16. A fusion sealing material in accordance with claim 15 wherein the SnO:ZnO ratio is 3.5:1 to 4.5:1.

17. A fusion sealing material in accordance with claim 9 that is capable of forming up to about 10% of a phosphate crystal phase when heated to a form a seal.

18. A fusion sealing material in accordance with claim 9 wherein the glass frit contains $B_2O_3$ in an amount sufficient to decrease the CTE of the glass frit, but not over about 3 mole percent.

19. A fusion sealing material in accordance with claim 18 wherein the $B_2O_3$ is substituted for $P_2O_5$ in the glass flit and the total $P_2O_5+B_2O_3$ is about 33 mole %.

* * * * *